(12) United States Patent
Tran (10) Patent No.: US 6,496,693 B1
(45) Date of Patent: Dec. 17, 2002

(54) METHOD AND APPARATUS FOR TRANSMITTING DATA TO A PAGER IN A COMMUNICATIONS SYSTEM

(75) Inventor: Trung M. Tran, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/098,373

(22) Filed: Jun. 16, 1998

(51) Int. Cl.[7] ............................. H04Q 7/20; G08B 5/22
(52) U.S. Cl. ...................... 455/426; 455/420; 455/458; 455/566; 340/7.1; 340/7.28
(58) Field of Search ................. 455/31.1–31.3, 455/38.1, 38.4, 420, 414, 566, 412, 413, 3.06, 426, 458; 340/825.44, 7.28, 7.31, 7.55, 7.57, 7.22; 370/310, 313, 493

(56) References Cited

U.S. PATENT DOCUMENTS

| | | | |
|---|---|---|---|
| 5,257,307 A | * 10/1993 | Ise | 379/57 |
| 5,333,266 A | 7/1994 | Boaz | 395/200 |
| 5,357,244 A | 10/1994 | van Zijl | 340/825 |
| 5,479,411 A | 12/1995 | Klein | 370/110 |
| 5,479,491 A | * 12/1995 | Herrero Garcia et al. | 379/88 |
| 5,481,255 A | 1/1996 | Albert | 340/825 |
| 5,528,739 A | 6/1996 | Lucas | 394/145 |
| 5,561,703 A | 10/1996 | Arledge | 379/57 |
| 5,696,500 A | * 12/1997 | Diem | 340/825.44 |
| 5,712,901 A | * 1/1998 | Meermans | 379/88 |
| 5,724,410 A | * 3/1998 | Parvulescu et al. | 379/88 |
| 5,724,412 A | * 3/1998 | Srinivasan | 379/93.23 |
| 5,742,905 A | * 4/1998 | Pepe et al. | 455/461 |
| 5,815,800 A | * 9/1998 | Su et al. | 455/31.3 |
| 5,870,454 A | * 2/1999 | Dahlen | 379/88.14 |
| 5,884,262 A | * 3/1999 | Wise et al. | 704/207 |
| 5,970,387 A | * 10/1999 | Yuan | 455/31.2 |
| 5,974,447 A | * 10/1999 | Cannon et al. | 709/206 |

OTHER PUBLICATIONS

IBM Technical Bulletin, Feb. 1994, US; vol. 37, Issue 2A, pp. 109–112; ref # 0018–8689–37–2A–109.*

* cited by examiner

Primary Examiner—Lester G. Kincaid
Assistant Examiner—Meless Zewdu
(74) Attorney, Agent, or Firm—Duke W. Yee; Jeffrey S. Labow; Michael R. Nichols (57) ABSTRACT

A method and apparatus for sending messages to a digital pager in a communications system. A voice message is received from a caller, wherein the voice message is to be sent to a pager. The voice message is transformed into a text message, wherein the message is transformed using a data processing system. The text message is sent to the digital pager across an air interface.

32 Claims, 4 Drawing Sheets

700 USER PROFILE TABLE

| | |
|---|---|
| PROFILE 1 | VOICE |
| PROFILE 2 | VOICE AND TEXT |
| PROFILE 3 | VOICE FIRST, TEXT SECOND |
| PROFILE 4 | MESSAGE: VOICE, SENDERS PHONE NUMBER: TEXT |
| PROFILE 5 | TEXT, FORMATTING INSTRUCTIONS |

USER PROFILE TABLE 700

| PROFILE 1 | VOICE |
|---|---|
| PROFILE 2 | VOICE AND TEXT |
| PROFILE 3 | VOICE FIRST, TEXT SECOND |
| PROFILE 4 | MESSAGE: VOICE, SENDERS PHONE NUMBER: TEXT |
| PROFILE 5 | TEXT, FORMATTING INSTRUCTIONS |

| DEVICE | DEVICE CAPABILITIES | USER PROFILE |
|---|---|---|
| PAGER 1 | TEXT | NO |
| PAGER 2 | VOICE AND TEXT | NO |
| PAGER 3 | VOICE AND TEXT | PROFILE 1 |
| CELL PHONE 1 | VOICE ONLY | NO |
| CELL PHONE 2 | VOICE AND TEXT | NO |
| CELL PHONE 3 | VOICE AND TEXT | PROFILE 2 |
| ADVANCED PAGER | VOICE, TEXT, OTHER | PROFILE 3 |

METHOD AND APPARATUS FOR TRANSMITTING DATA TO A PAGER IN A COMMUNICATIONS SYSTEM

BACKGROUND OF THE INVENTION

1. Technical Field

The present invention relates generally to an improved data processing system and in particular to a method and apparatus for wireless communications. Still more particularly, the present invention relates to a method and apparatus for sending text and or voice messages to a digital pager.

2. Description of the Related Art

A pager system is a communications system used to contact a person who may be away from a telephone and whose whereabouts may be unknown. A pager system provides a service to call a person by radio who is absent and transmitting a message to him, such as, for example, a text message or a phone number. A caller typically uses a telephone connected to a public telephone line to contact a pager system to transmit a pager signal to a digital pager unit at which time a called party receives a message. When the caller contacts the pager system, instructions may be given to the caller as to how to input a message to the called party. With numerical messages, the caller typically enters digits using DTMF tones from a telephone device. This numerical message is then forwarded to the called party. Alternatively, the caller may in some instances be able to send a text message to a person carrying a digital pager unit that can receive text, but not E-mail. In such a situation, the caller calls a telephone number that is answered by a third party who is the message carrier. This third party is a person who listens to the caller to obtain the message to be sent to the called party. At that time, the third party enters the message into the pager system, which is then sent to the called party. One drawback of such a system is that messages between the caller and the called party cannot be kept secret because a third party is involved in transferring a message to the called party.

Therefore, it would be advantageous to have an improved method and apparatus for sending text messages to a digital pager.

SUMMARY OF THE INVENTION

It is one object of the present invention to provide an improved data processing system.

It is another object of the present invention to provide a method and apparatus for wireless communications.

It is yet another object of the present invention to provide a method and apparatus for sending text and/or voice messages to a digital pager.

An additional object of the present invention is to provide an improved method and apparatus for sending text and/or voice messages to multiple recipients.

A further object of the present invention is to provide a method and apparatus sending text and/or voice messages to a recipient without requiring a third party, such as a message carrier.

The present invention provides a method and apparatus for sending messages to a digital pager in a communications system. A voice message is received from a caller, wherein the voice message is to be sent to a pager. The voice message is transformed into a text message, wherein the message is transformed using a speech recognition program in a data processing system. The text message is sent to the digital pager via transmission means.

The foregoing objects are achieved as is now described.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
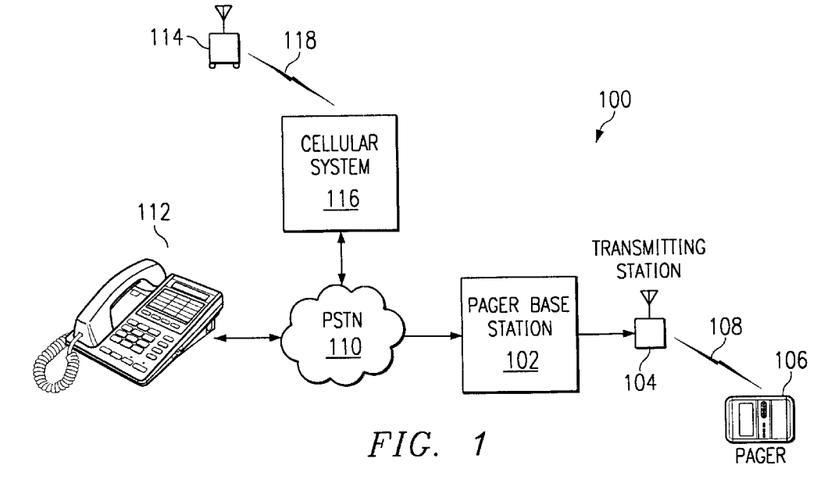
FIG. 1 is a diagram of a communications system in which the present invention may be implemented.

With reference now to the figures, and in particular with reference to FIG. 1, a diagram of a communications system in which the present invention may be implemented is illustrated. Communications system 100 includes a pager base station 102, a transmitting station 104, and communications device in the form of a pager 106, which all form a pager system, which is typically operated by a pager carrier, such as, for example, Motorola, Inc. In the depicted example, pager 106 using a digital pager that is capable of receiving a text string, but may or may not be able to receive E-mail. Pager base station 110 includes all of the equipment and processes necessary to receive and format messages for transmission to pager 106 by transmitting station 104. Messages received at pager base station 102 are transmitted to pager 106 through transmitting station 104 by digital or analog transmission means 108 by which communications are facilitated between transmitting station 104 and pager 106. The depicted example illustrates a single pager base station with a single transmitting station and a single pager for purposes of describing the present invention. Other numbers and configurations of pagers, transmitting stations, and pager base stations may be employed depending upon the implementation. Messages may be received by pager base station 102 through public switch telephone network (PSTN) 110. For example, a user at telephone unit 112, connected to PSTN 110, may send messages to pager 106 by transmitting the message to pager base station 102 through PSTN 110.

Additionally, messages also may be sent to pager 106 from a mobile communications device, such as cellular telephone. For example, mobile station 114 sends and receives communication signals to and from cellular system 116 across cellular interface 118. A user at mobile station 114 may send a message to pager 106 by transmitting the message through cellular system 116 to PSTN 110 and finally pager base station 102. As with the pager system, the cellular system may contain numerous mobile stations and may have various configurations.

The present invention may be implemented within communications system 100. In particular in the depicted example, the processes of the present invention may be implemented within pager base station 102. A caller, also referred to as a sender, at a telephone unit or a mobile station, such as, for example, telephone 112 or mobile station 114, may initiate a call with a pager carrier by dialing a number for the pager carrier service. Once the sender is connected to the pager carrier, the sender or caller identifies one or more recipients using identifiers such as personal identification numbers (PINs). The identifiers are entered by depressing keys on a keypad located on a telephone or mobile station. Alternatively, the identifiers could be entered by voice. In addition, a distribution list may be selected in which a distribution list includes the identifiers of recipients. Names may be associated with the identifiers. These identifiers are unique identifiers and may actually be a pager number for the recipient. After identifying the receiver or receivers, the sender begins to send the message by speaking into the telephone or mobile station. The message is received by the pager carrier and transformed into text using a data processing system running an application that transforms the spoken message into text. This application in the depicted example is a speech recognition engine. Thereafter, the text is sent to pager or pagers associated with the recipient or recipients.

Figure 2:
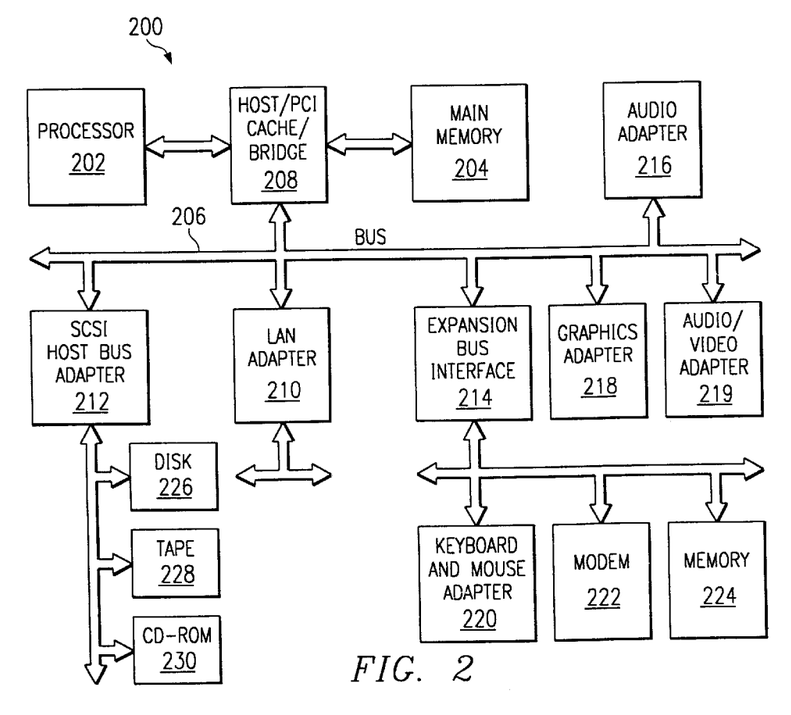
FIG. 2 is a block diagram of a data processing system in which the present invention may be implemented.

Turning next to FIG. 2, a block diagram of a data processing system 200 in which the present invention may be implemented is illustrated. Data processing system 200 employs a peripheral component interconnect (PCI) local bus architecture. Although the depicted example employs a PCI bus, other bus architectures such as Micro Channel and ISA may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, SCSI host bus adapter 212, and expansion bus interface 214 are connected to PCI local bus 206 by direct component connection. In contrast, audio adapter 216, graphics adapter 218, and audio/video adapter (A/V) 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM 230 in the depicted example. Typical PCI local bus implementations will support three or four PCI expansion slots or add-in connectors. The depicted example includes four loads on the motherboard and three expansion slots. Those of ordinary skill in the art will appreciate that the hardware in FIG. 2 may vary. For example, other peripheral devices, such as optical disk drives and the like may be used in addition to or in place of the hardware depicted in FIG. 2. The depicted example is not meant to imply architectural limitations with respect to the present invention.

The processes of the present invention used to translate spoken messages, also referred to as voice messages, into text may be executed within data processing system 200 in FIG. 2. In the depicted example, this data processing system is located within the pager system of the pager carrier. For example, in the depicted example, data processing system 200 is located within pager base station 102. Alternatively, data processing system 200 implementing the processes of the present invention may be located within PSTN 110 or cellular system 116.

Figure 3:
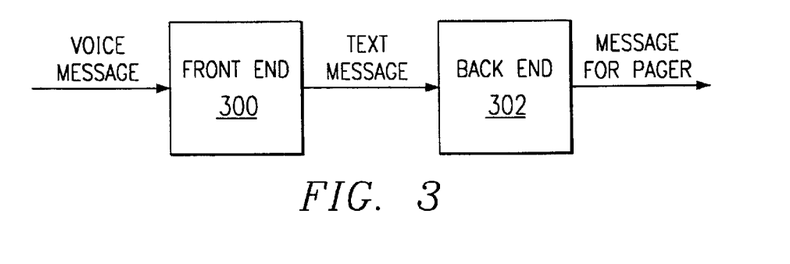
FIG. 3 is a block diagram of applications used to implement a preferred embodiment of the present invention.

Turning next to FIG. 3, a block diagram of applications used to implement a preferred embodiment of the present invention is illustrated. Front end application 300 and back end application 302 are executed by a microprocessor within a data processing system, such as, for example, data processing system 200 in FIG. 2. Front end application 300 employs speech recognition technology. This technology allows a data processing system to recognize the spoken word(s) for the purpose of receiving commands and/or data input from a speaker. Such systems can be used to recognize words and perform tasks. Additionally, such systems and related speech synthesis technology are employed to convert text to speech or speech to text, which is the use employed by front end application 300. Front end application 300 receives the voice message from the sender and translates this voice message into text. Additionally, front end application 300 also receives an identification of one or more recipients for the message. The message and identifiers are then sent to back end application 302, which then sends the message to the identified recipient or recipients. Back end application 302 contains presently available paging processes and functions.

Figure 4:
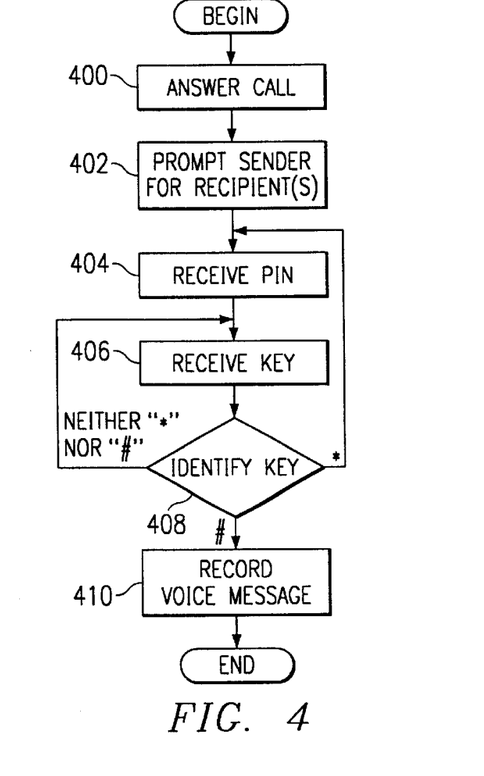
FIG. 4 is a flowchart of a process for receiving and identifying recipients for a message in accordance with a preferred embodiment of the present invention.

Turning now to FIG. 4, a flowchart of a process for receiving and identifying recipient(s) for a message is depicted in accordance with a preferred embodiment of the present invention. The process begins answering a call from a sender (step 400). Thereafter, the process prompts the sender for identification of one or more recipients (step 402). For example, the process may use the following prompt: "Please enter the PIN of the recipient.", "If another recipient is to be entered, press the '*' key.", "If no additional recipients are to be entered, press the '#' key". The process then receives a PIN (step 404) and a key after the PIN (step 406). The process then identifies the key sent by the sender (step 408). If the key is a "*", the process then returns to step 404 to receive another PIN. If the key is a "#", the process then proceeds to record the voice message (step 410) with the process terminating thereafter. With reference again to step 408, if the key is neither a "*" key nor a "#" key, the process then returns to step 406.

Figure 5:
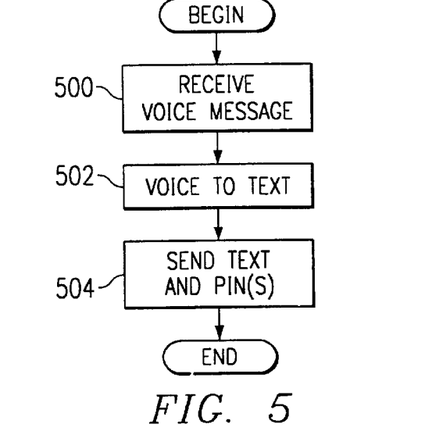
FIG. 5 is a flowchart of a process employed by a front end application in accordance with a preferred embodiment of the present invention.

Turning now to FIG. 5, a flowchart of a process employed by a front end application is depicted in accordance with a preferred embodiment of the present invention. The process begins by receiving the recorded voice message (step 500). Thereafter, the process translates the voice message into text (step 502). The process then sends the text message along with the PIN or PINs to the back end application for transmission to the recipient or recipients (step 504). Pager numbers or names may be used instead of PINs in the depicted example.

Figure 6:
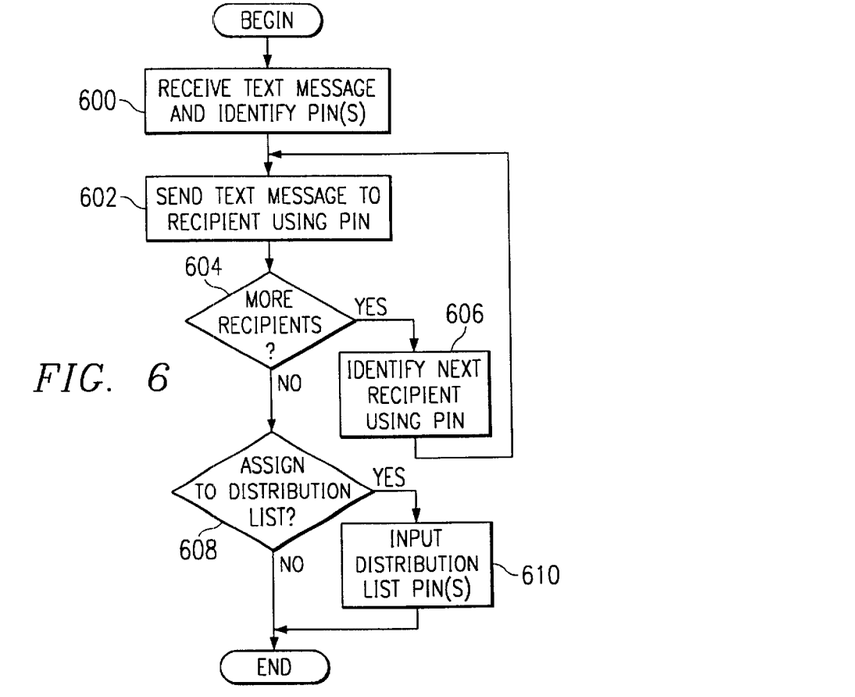
FIG. 6 is a flowchart of a process employed by a back end application to send text messages to a pager in accordance with a preferred embodiment of the present invention.

FIG. 6 is a flowchart of a process employed by a back end application to send text messages to a pager in accordance with a preferred embodiment of the present invention. The process begins by receiving the text message and one or more PINs for one or more recipients (step 600). The process then sends the text message to a recipient using the PIN associated with the recipient (step 602). A PIN is associated with each pager held by a recipient. In the depicted example, the PIN may be assigned when the pager is purchased or received by the recipient. A determination is then made as to whether additional recipients have been identified to receive the text message (step 604). If additional recipients are present, the next recipient is identified using the PIN associated with that recipient (step 606). Thereafter, the process returns to step 602 to send the text message to the identified recipient. With reference again to step 604, if no additional recipients are present, a determination is made as to whether to assign the recipients identified in step 606 into a distribution list (step 608). A distribution list may be created for quickly sending pages to a group of recipients defined by the sender without having to renter the recipients each time a message is sent. If the recipients are to be assigned to a distribution list, the PINs are entered into the distribution list (step 610) with the process then terminating. Otherwise, the process terminates.

The processes of the present invention may be applied to a variety of different types of communications devices in addition to a digital pager. For example, the processes of the present invention may be applied to sending messages to a cellular phone or a voice pager, which presents messages in an audio format. Additionally, a message may be sent, received, and played back in a variety of different media, such as voice or text, or even video, depending on the capabilities of the receiving communications device. For example, a device such as a digital cellular phone may have the capability to receive and display text messages on a display contained within the phone as well as present a voice message to a recipient. Some pagers are able to receive voice messages that are presented to the recipient in an audio format. In such a communications system, a user profile is defined to determine in which media (i.e., text or audio) the message is to be sent to a recipient.

Figure 7:
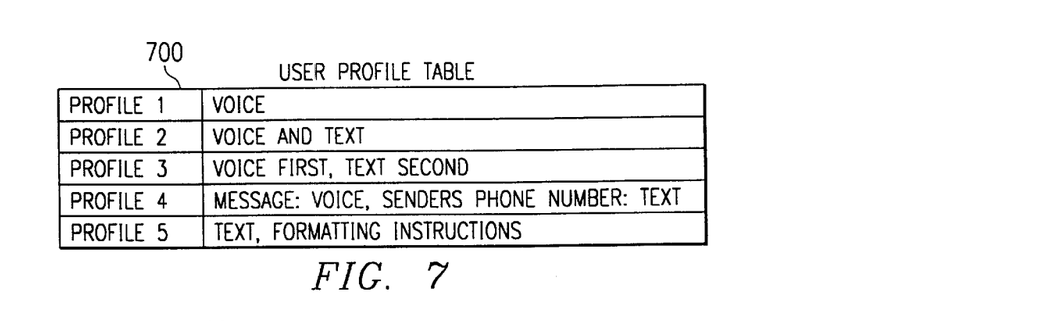
FIG. 7 is a table of user profiles that define the media used to send a message to a recipient in accordance with a preferred embodiment of the present invention.

In FIG. 7, table 700 is an example of user profiles that define the message media to a recipient in accordance with a preferred embodiment of the present invention. For example, profile 1 in table 700 indicates that only a voice message is sent to the recipient even if the recipient can receive both voice and text messages. Profile 2 indicates that both text and voice are to be sent to the recipient while profile 3 sends a voice message first followed by a text message. The sender's phone number is included with the voice and text message in profile 4. Finally, profile 5 includes formatting instructions for the text.

The profiles may be defined by a sender, by a recipient, or both by a sender and a recipient. This mechanism allows a recipient to choose the media for the message in a recipient user profile. The sender also is allowed to set a profile (a sending user profile) to choose what type of message will be sent to a recipient. In the depicted example, if the sender and the recipient set different types of media, the media defined by the recipient user profile is used to send the message. If a recipient user profile is not present, the sending user profile can be used. Alternatively, both the sender and the recipient may set profiles in which the media defined by the sender will be sent to recipient only if the recipient has chosen to receive that media. The recipient is unable to receive messages in a media not selected by the sender.

Figure 8:
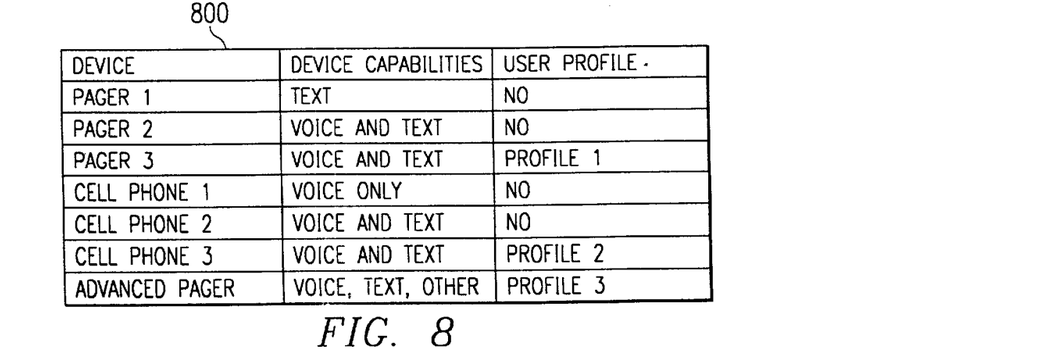
FIG. 8 is a table of devices and device capabilities used to determine what type of media can be used to transmit messages to different types of devices in accordance with a preferred embodiment of the present invention.

In FIG. 8, table 800 is a table of devices and device capabilities used to determine what type of media can be used to transmit messages to different types of devices in accordance with a preferred embodiment of the present invention. Table 800 includes devices such as pagers and cell phones along with device capabilities. For example, Pager 1 only receives text while Pager 2 and Pager 3 receive both voice and text messages. Cell Phone 1 receives voice while Cell Phone 2 and Cell Phone 3 can receive both voice and text. In the depicted example in table 800, Advanced Pager can receive voice and text along with other other information, such as for example, formatting instructions. Further user profiles defined for a user of a device are included. Pager 3 in the depicted example, is associated with profile 1 in table 700. The profile results in text being sent to the recipient event though the device can receive both voice and text. Advanced Pager is associated with profile 3, which results in a voice message being sent to the page first with a text message being sent second.

Figure 9:
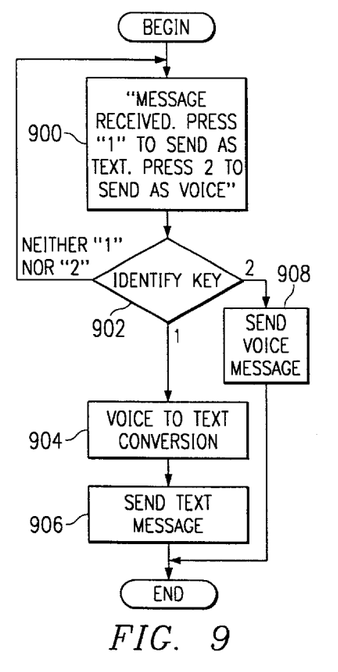
FIG. 9 is a flowchart of a process for a sender of a message to select a media for a message in accordance with a preferred embodiment of the present invention.

With reference now to FIG. 9, a flowchart of a process for a sender of a message to select a media for a message is depicted in accordance with a preferred embodiment of the present invention. The process begins by prompting the user to press "1" to send text or "2" to send the message using voice as the media (step 900). The key entered by the user is then identified (step 902). If neither "1" nor "2" is entered the process returns to step 900. A "1" results in voice to text conversion (step 904) and the message being sent as text (step 906) with the process terminating thereafter. A "2" causes a voice message to be sent (step 908) with the process terminating thereafter. FIG. 9 illustrates a simplified process for selecting either voice or text to be sent to the recipient.

Figure 10:
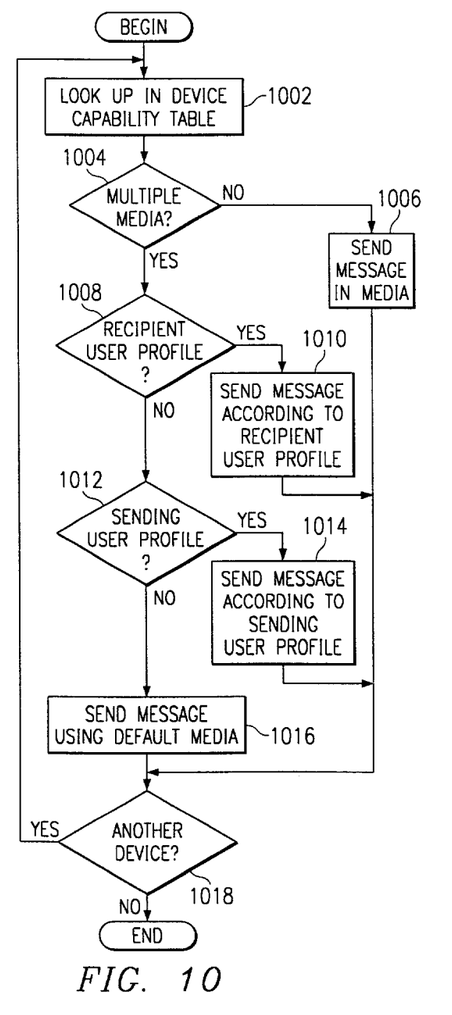
FIG. 10 is a flowchart of a process for sending messages to devices using user profiles in accordance with a preferred embodiment of the present invention.

With reference next to FIG. 10, a flowchart of a process for sending messages to devices using user profiles is illustrated in accordance with a preferred embodiment of the present invention. When a request to send a message to one or more devices is received, the device is looked up in a device capability table, such as table 800 in FIG. 8 (step 1002). A determination is then made as to whether the device is capable of multiple media (step 1004). In the depicted example, if the device is not capable of multiple media, the message is sent using the media that the device is capable of receiving (step 1006). On the other hand, if multiple media is present for the device, a determination is made as to whether a recipient user profile is present (step 1008). If a recipient user profile is present, the message is sent according the recipient user profile (step 1010) with the process terminating thereafter. If no recipient user profile is present, a determination is made as to whether a sending user profile is present (step 1012). If a sending user profile is present, the message is sent according the sending user profile (step 1014).

If neither a recipient user profile nor a sending user profile is present, a default media is used to send the message to the recipient (step 1016). After steps 1016, 1006, 1010, and 1014, a determination is made as to whether the message is to be sent to another device (step 1018). If another device is present, the process returns to step 1002. Otherwise, the process terminates.

Therefore, the present invention provides an improved method and apparatus for sending messages to a pager. In particular, the present invention provides increased security with respect to messages sent from a sender to a receiver. This advantage is provided by eliminating the need for a third party person to type in the text message. Instead, a speech to text converter is employed to make such a conversion. Additionally, the present invention allows a sender to send a message to multiple recipients directly and secretly without requiring the sender to call another number or call back and repeat the same message.

It is important to note that while the present invention has been described in the context of a fully functioning data processing system used with a communications system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include: recordable-type media such a floppy discs and CD-ROMs and transmission-type media such as digital and analog communications links.

The description of the preferred embodiment of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention the practical application to enable others of ordinary skill in the art to understand the invention for various embodiments with various modifications as are suited to the particular use contemplated.

What is claimed is:

1. A method for sending message to a pager in a communications system, the method comprising:

receiving, in the communications system, a voice message from a calling communications device, wherein the voice message is to be sent to a pager;

automatically transforming the voice message into a text message, wherein the message is automatically transformed by a data processing system in response to reception of the voice message, wherein the data processing system is coupled to the communications system to receive the voice message;

sending the text message to the pager;

identifying if a user profile associated with the pager indicates that a user of the pager opts to receive messages in a user-specified mode for receiving both text and voice, wherein the user-specified mode is one of a plurality of modes of the pager; and if the the user profile indicates that the user opts to receive messages in the user-specified mode, transmitting the voice message along with the text message.

2. The method of claim 1 further comprising:

detecting a call to the communications system and answering the call prior to receiving the voice message.

3. The method of claim 1 further comprising:

receiving an identifier identifying the pager.

4. The method of claim 1, wherein the pager is a first pager and the voice message also is to be sent to a second pager and further comprising receiving a first identifier identifying the first pager and receiving a second identifier identifying the second pager and sending the text message to the second pager.

5. The method of claim 1, wherein the data processing system is a computer including a voice to text conversion software for transforming the voice message into the text message.

6. A method for sending messages to a pager in a communications system, the method comprising:

receiving from a calling communications device identifiers identifying a plurality of target pagers in the communications system;

receiving from the calling communications device a voice message for transmission to the plurality of target pagers in the communications system;

sending the voice message to a data processing system;

automatically translating the voice message, without third party intervention, into a text message using the data processing system;

transmitting the text message to the plurality of pagers using the identifiers identifying the plurality of pagers;

identifying if user profiles associated with a subset of the plurality of pagers indicate that users associated with the subset of the plurality of pages opt to receive messages in a user-specified mode for receiving both text and voice, wherein the user-specified mode is one of a plurality of modes of the plurality of pagers; and if the user profiles indicate that the user opt to receive messages in the user-specified mode, transmitting the voice message along with the text message to the subset of the plurality of pagers.

7. The method of claim 6, wherein the plurality of identifiers is a plurality of personal identification numbers.

8. The method of claim 6, wherein the plurality of pagers are digital pagers.

9. A communications system comprising:

reception means for receiving a voice message from a calling communications device, wherein the voice message is to be sent to a pager;

transformation means for transforming the voice message into a text message, wherein the message is transformed using a data processing system;

sending means for sending the text message to the pager across an air interface;

detection means for detecting whether a user profile associated with the pager indicates that a user of the pager opts to receive messages in a user-specified mode for receiving both text and voice, wherein the user-specified mode is one of a plurality of modes of the pager; and further sending means, responsive to detecting that the user profile indicates that the user opts to receive messages in the user-specified mode, for sending the voice message along with the text message to the pager across an air interface.

10. The communications system of claim 9 further comprising:

detection means for detecting a call to the communications system and answering the call.

11. The communications system of claim 9 further comprising:

reception means for receiving an identifier identifying the pager.

12. The communications system of claim 9, wherein the data processing system is a computer including a voice to text conversion software for transforming the voice message into the text message.

13. A communications system comprising:

first receiving means for receiving from a calling communications device identifiers identifying a plurality of target pagers;

second receiving means for receiving from the calling communications device a voice message for transmission to the plurality of target pagers;

translation means for translating the voice message into a text message using a data processing system;

transmission means for transmitting the text message to the plurality of pagers using the identifiers identifying the plurality of pagers;

detection means for detecting whether a user profile associated with one of the plurality of pagers indicates that a user of the one of the plurality of pagers opts to receive messages in a user-specified mode for receiving both text and voice; and further transmission means for transmitting the voice message along with the text message to the one of the plurality of pagers across an air interface.

14. The communications system of claim 13, wherein the identifiers are personal identification numbers.

15. A communications system comprising:

a transmitter, wherein the transmitter is employed to transmit text messages to a target pager;

a data processing system having a plurality of modes of operation including:

a first mode of operation in which the data processing system monitors for calls;

a second mode of operation, responsive to detecting a call in the first mode of operation, in which the data processing system answers the call and receives a voice message to be transmitted to the pager;

a third mode of operation, responsive to receiving the voice message in the second mode of operation, in which the data processing system translates the voice message into a text message; and a fourth mode of operation, responsive to the third mode of operation translating the voice message into a text message, in which the data processing system transmits the text message to the target pager using the transmitter;

a fifth mode of operation, responsive to receiving the voice message in the second mode of operation, in which the, data processing system determines if a user profile associated with the target pager indicates that a user of the target pager opts to receive messages in a user-specified mode for receiving both voice and text, and if so, transmitting said voice message to said target pager.

16. The communications system of claim 15, wherein the second mode of operation also receives at least one identifier identifying at least the target pager.

17. The communications system of claim 16, wherein the data processing system receives a plurality of identifiers identifying a plurality of target pagers and further comprising a sixth mode of operation, responsive to receiving a plurality of identifiers in the second mode of operation and responsive to the third mode of operation translating the voice message into a text message, in which the communications system transmits the message to the plurality of target pagers using the transmitter.

18. A computer program product, for use with a data processing system, for transmitting a message to a pager in a communications system, the computer program product comprising:

first instruction for receiving a voice message from a calling communications device, wherein the voice message is to be sent to a pager;

second instructions for transforming the voice message into a text message;

third instructions for sending the text message to the pager; and fourth instructions for sending the voice message along with the text message, in response to a determination that an option contained in a user profile associated with the pager has been set by a user of the pager to enable receiving voice and text together.

19. A method for sending messages to a communications device in a communications system, the method comprising:

receiving a message in a first medium within multiple media from a sender, wherein the message is to be sent to a communications device;

identifying a recipient communications device for the message;

identifying a plurality of media in which the recipient communications device is capable of receiving messages;

transforming the message from the first medium within the multiple media to a second medium within the plurality of media; and sending the message to the recipient communications device using both the first medium and the second medium, in response to a determination that an option contained in a user profile associated with the recipient communications device has been set by a user of the recipient communications device to enable receiving information in the first medium and the second medium together.

20. The method of claim 19, wherein the message is a voice message and wherein the step of transforming the message comprises:

transforming the voice message into a text message, wherein the message is automatically transformed by a data processing system in response to the second medium being text.

21. The method of claim 19, wherein the message is a text message and wherein the step of transforming the message comprises:

transforming the text message into a voice message, wherein the message is automatically transformed by a data processing system in response to the second medium being voice.

22. The method of claim 19, wherein the step of identifying a recipient communications device for the message includes:

determining whether a profile is present identifying media within the plurality of media to be used to send the message to the recipient communications device.

23. The method of claim 22, wherein the profile is defined by the sender.

24. The method of claim 22, wherein the profile is defined by a recipient.

25. The method of claim 22 further comprising:

determining whether the message is to be sent to additional recipient communications devices;

identifying a respective plurality of receivable media for each of the additional recipient communications devices; and sending the message to each of the additional recipient communications devices using at least one of its respective plurality of receivable media.

26. The method of claim 25, wherein the respective plurality of receivable media for one of the additional recipient communications devices comprises voice and text.

27. A communications system comprising:

receiving means for receiving a message in a first medium within multiple media from a sender, wherein the message is to be sent to a communications device;

first identification means for identifying a recipient communications device for the message;

second identification means for identifying a plurality of media in which the recipient communications device is capable of receiving messages;

transformation means for transforming the message from a first medium within the multiple media to a second medium within the plurality of media; and sending means for sending the message to the recipient communications device using both the first medium and the second medium, in response to a determination that an option contained in a user profile associated with the recipient communications device has been set by a user of the recipient communications device to enable receiving information in the first medium and the second medium together.

28. The communications system of claim 27, wherein the message is a voice message and wherein the transformation means comprises:

transformation means for transforming the voice message into a text message, wherein the message is automatically transformed by a data processing system in response to the second medium being text.

29. The communications system of claim 27, wherein the message is a text message and wherein the transformation means comprises:

transformation means for transforming the text message into a voice message, wherein the message is automatically transformed by a data processing system in response to the second medium being voice.

30. The communications system of claim 27, wherein identification means includes:

determination means for determining whether a profile is present identifying media within the plurality of media to be used to send the message to the recipient communications device.

31. The communications system of claim 27, wherein the profile is defined by the sender.

32. The communications system of claim 27, wherein the profile is defined by a recipient.

* * * * *

UNITED STATES PATENT AND TRADEMARK OFFICE
CERTIFICATE OF CORRECTION

PATENT NO.    : 6,496,693 B1
DATED         : December 17, 2002
INVENTOR(S)   : Tran It is certified that error appears in the above-identified patent and that said Letters Patent is hereby corrected as shown below:

<u>Title page,</u>
Item [74], please delete "Labow" and insert -- LaBaw --.

<u>Column 9,</u>
Line 41, after "the", delete ",".

Signed and Sealed this

Fifth Day of August, 2003

JAMES E. ROGAN
*Director of the United States Patent and Trademark Office*